Patented Sept. 22, 1953

2,653,144

UNITED STATES PATENT OFFICE 2,653,144

STABILIZED POLYHEPTAMETHYLENEUREA AND PROCESS FOR MAKING THE SAME

Edward A. Wielicki, Philadelphia, Pa., assignor to American Viscose Corporation, Wilmington, Del., a corporation of Delaware No Drawing. Application August 3, 1950, Serial No. 177,561

13 Claims. (Cl. 260—77.5)

This invention relates to polyheptamethyleneurea stabilized against changes in viscosity and molecular weight which usually take place on heating thereof, and to a process for producing the viscosity-stabilized polymer.

Polyheptamethyleneurea can be prepared by heating substantially equimolecular proportions of heptamethylene diamine and urea or heptamethylene diisocyanate to reaction temperature until a solid polyurea having the desired molecular weight is obtained. The polyurea fuses at a temperature of 250 to 280° C. and on continued heating forms a molten mass from which cold-drawable filaments can be formed.

Polyheptamethyleneurea has the disadvantage that the molten mass obtained by heating it to fusing temperature increases in viscosity and molecular weight under conditions of continued heating such as are encountered in spinning, film-pressing, compounding and other operations. For example, when it is desired to spin continuous filaments directly from a molten mass of a fiber-forming polyheptamethyleneurea, the condensate tends to increase in viscosity as the heating required to maintain it in the fluid condition is continued, with the result that the spinning of filaments becomes increasingly difficult, and connot be continued for more than about 15 minutes.

It is an object of this invention to stabilize polyheptamethyleneurea so that it remains unchanged or substantially unchanged in viscosity and capable of being drawn into filaments of uniform denier for at least one hour on being heated at a temperature between 250 and 280° C.

This and other objects are achieved by preparing the polyheptamethyleneurea in the presence of a viscosity stabilizer selected from the group consisting of aniline, unsymmetrical diphenylurea, diphenylamine, hexamethylenediammonium acetate, and acetic acid. Of the stabilizing agents mentioned, aniline is preferred, since it affords maximum stabilization of the melt viscosity with minimum discoloration of the melt on prolonged heating.

It is not sufficient to add the stabilizing agent to the polyheptamethyleneurea after it has been produced. To accomplish the objectives of this invention, the stabilizer must be present in the reacting mass, and in the preferred embodiment it is mixed with the reactants prior to heating them to polyurea-forming temperature. It is believed that these stabilizing agents, or products formed by rearrangement thereof under the polyurea-forming conditions, function as chain terminators, reacting with the terminal groups of the polyurea to prevent further condensation on continued heating of the melt.

The stabilizing agents mentioned exhibit specificity as viscosity-stabilization agents for polyheptamethyleneurea, however, and not every substance which is theoretically capable of reacting with the terminal group of the polyurea, or which forms such substances by rearrangement in situ in the reacting mass, is effective as a stabilizer. For example, although unsymmetrical diphenylurea (which rearranges under the conditions of the reaction to form diphenylamine and cyanic acid) is satisfactory for use for the present purposes, symmetrical butylurea (which rearranges to form butylamine and butyl isocyanate) is not satisfactory. When heptamethylene diamine and urea were reacted in the presence of sym. butylurea, the melt became filament-forming about ten minutes after the temperature had reached 275° C., but on continued heating for only a half hour longer the viscosity increased objectionably and spinning had to be discontinued.

The amount of stabilizing agent which is mixed with the polyurea-forming reactants is comparatively small, amounts of from about 0.5 to 5.0 percent by weight of the stabilizer being satisfactory. About 2 percent by weight of aniline affords maximum stabilization of the viscosity of the melt with minimum discoloration thereof.

Further details of the practice of the invention are set forth in the following examples, in which the parts are by weight.

*Example I*

Equimolecular proportions of urea and heptamethylenediamine (weight ratio 3 parts of urea to 6.5 parts of heptamethylene diamine) and 0.18 part of aniline were placed in a vessel. The mixture was blanketed with nitrogen and the vessel was immersed in a Wood's metal bath at 130° C. and maintained at that temperature for 45 minutes. After the mixture solidified the temperature was raised to 265° C. After two hours at 265° C., a sample of the molten polymer was found to have a specific viscosity of 0.18. After an additional two hours at 265° C., the polymer still had a specific viscosity of 0.18. The polymer melt was spun into a cold-drawable filament of uniform denier. Spinning could be continued for about five hours.

*Example II*

Example I was repeated except that the polyurea-forming reactants comprised equimolecular proportions of heptamethylene diamine and heptamethylene diisocyanate. The condensate melted at 250° C. and was filament-forming. The specific viscosity of a 0.2 percent solution of the polyurea in m-cresol-formic acid mixture was 0.19 and remained unchanged for more than an hour.

*Example III*

A vessel was charged with equimolecular proportions of heptamethylene diamine and urea (weight ratio 6.5 parts of heptamethylene diamine to 3 parts of urea) and 0.63 part of unsymmetrical diphenylurea. The mixture was blanketed with nitrogen, and the vessel was immersed in Wood's metal at 130° C., and maintained at that temperature for one hour, after which the temperature was raised to 165° C. The product solidified after a half hour, and the temperature was raised to 265° C., at which temperature the polymer became molten. After 40 minutes, the melt could be drawn into cold-drawable filaments having extremely good tensile strength. Filaments of uniform denier could be drawn from the melt for a period of more than one hour.

*Example IV*

Equimolecular proportions of urea and heptamethylene diamine (weight ratio 3 parts of urea to 6.5 parts of heptamethylene diamine) and 0.36 part of acetic acid were charged to a vessel. Nitrogen was passed over the mixture and the vessel was immersed in a Wood's metal bath at 140° C. The temperature was maintained at 130–140° C. for one hour, and then was raised to 165° C. The product solidified in three-quarters of an hour, and the temperature was then rapidly raised to 270° C. After three hours, the polymer became filament-forming. The melt remained fluid and satisfactory filaments were drawn from it for a period of three hours.

*Example V*

Equimolecular proportions of urea and heptamethylene diamine (weight ratio: 3 parts of urea to 6.5 parts of heptamethylenediamine) and 0.5 part of hexamethylenediammonium acetate were charged to a vessel. Nitrogen was passed through the vessel continuously. The vessel was heated at 130° C. for two and a half hours, then at 160° C. for a half hour, at the end of which time the product solidified. The temperature was then raised to 275° C. and after a half hour filaments could be drawn from the melt. Heating at 275° C. was continued for five hours, during which period there was only a slight increase in viscosity. The solidified condensate was soluble in m-cresol-formic acid mixture.

*Example VI*

Equimolecular proportions of urea and heptamethylene diamine and 0.34 part of diphenylamine were placed in a vessel. Nitrogen was passed over the mixture and the vessel was immersed in a Wood's metal bath at 130° C. After an hour, the temperature was raised to 160° C. The product solidified in about one hour, after which the temperature was raised to 260° C. The polymer was molten at this temperature. After three-quarters of an hour, the melt was capable of forming filaments. Satisfactory filaments were formed from the melt for a period of one hour, after which the spinning was discontinued although the melt was still fluid.

It will be apparent from the foregoing that by adding a minor proportion of the stabilizers mentioned to the polyheptamethyleneurea-forming reactants, the melt viscosity of the condensate is stabilized against change for a practicable length of time.

The invention is defined by the appended claims.

I claim:

1. A process for producing polyheptamethyleneurea which is stabilized against changes in melt-viscosity when it is heated at a temperature between 250 and 280° C. for at least one hour, which comprises heating substantially equimolecular proportions of heptamethylene diamine and a substance selected from the group consisting of urea and heptamethylene diisocyanate to polyurea-forming temperature, in the presence of a minor proportion of a substance selected from the group consisting of aniline, unsymmetrical diphenylurea, diphenylamine, acetic acid, and hexamethylene diammonium acetate.

2. A process for producing polyheptamethyleneurea which is stabilized against changes in melt-viscosity when it is heated at a temperature between 250 and 280° C. for at least one hour, which comprises heating substantially equimolecular proportions of heptamethylene diamine and a substance selected from the group consisting of urea and heptamethylene diisocyanate to polyurea-forming temperature, in the presence of a minor proportion of aniline.

3. A process for producing polyheptamethyleneurea which is stabilized against changes in melt-viscosity when it is heated at a temperature between 250 and 280° C. for at least one hour, which comprises heating substantially equimolecular proportions of heptamethylene diamine and a substance selected from the group consisting of urea and heptamethylene diisocyanate to polyurea-forming temperature, in the presence of a minor proportion of unsymmetrical diphenylurea.

4. A process for producing polyheptamethyleneurea which is stabilized against changes in melt-viscosity when it is heated at a temperature between 250 and 280° C. for at least one hour, which comprises heating substantially equimolecular proportions of heptamethylene diamine and a substance selected from the group consisting of urea and heptamethylene diisocyanate to polyurea-forming temperature, in the presence of a minor proportion of acetic acid.

5. A process for producing polyheptamethyleneurea which is stabilized against changes in melt-viscosity when it is heated at a temperature between 250 and 280° C. for at least one hour, which comprises heating substantially equimolecular proportions of heptamethylene diamine and a substance selected from the group consisting of urea and heptamethylene diisocyanate to polyurea forming temperature, in the presence of a minor proportion of hexamethylene diammonium acetate.

6. A process for producing polyheptamethyleneurea which is stabilized against changes in melt-viscosity when it is heated at a temperature between 250 and 280° C. for at least one hour, which comprises heating substantially equimolecular proportions of heptamethylene diamine and a substance selected from the group consisting of urea and heptamethylene diisocyanate to polyurea forming temperature, in the presence of a minor proportion of diphenylamine.

7. A composition of matter comprising the product obtained from the reaction by heating of substantially equimolecular proportions of heptamethylene diamine and a substance selected from the group consisting of urea and heptamethylene diisocyanate to polyurea-forming temperature with a minor proportion of a substance selected from the group consisting of aniline, unsymmetrical diphenylurea, acetic acid, diphenylamine and hexamethylene diammonium acetate, said product, in respect to its melt-viscosity, being stable to heat at a temperature between 250° C. and 280° C. for at least one hour.

8. A composition of matter comprising the product obtained from the reaction by heating of substantially equimolecular proportions of heptamethylene diamine and a substance selected from the group consisting of urea and heptamethylene diisocyanate to polyurea-forming temperature with a minor proportion of aniline, said product, in respect to its melt-viscosity, being stable to heat at a temperature between 250° C. and 280° C. for at least one hour.

9. A composition of matter comprising the product obtained from the reaction by heating of substantially equimolecular proportions of heptamethylene diamine and a substance selected from the group consisting of urea and heptamethylene diisocyanate to polyurea-forming temperature with a minor proportion of unsymmetrical diphenylurea, said product, in respect to its melt-viscosity, being stable to heat at a temperature between 250° C. and 280° C. for at least one hour.

10. A composition of matter comprising the product obtained from the reaction by heating of substantially equimolecular proportions of heptamethylene diamine and a substance selected from the group consisting of urea and heptamethylene diisocyanate to polyurea-forming temperature with a minor proportion of acetic acid, said product, in respect to its melt-viscosity, being stable to heat at a temperature between 250° C. and 280° C. for at least one hour.

11. A composition of matter comprising the product obtained from the reaction by heating of substantially equimolecular proportions of heptamethylene diamine and a substance selected from the group consisting of urea and heptamethylene diisocyanate to polyurea-forming temperature with a minor proportion of hexamethylene diammonium acetate, said product, in respect to its melt-viscosity, being stable to heat at a temperature between 250° C. and 280° C. for at least one hour.

12. A composition of matter comprising the product obtained from the reaction by heating of substantially equimolecular proportions of heptamethylene diamine and a substance selected from the group consisting of urea and heptamethylene diisocyanate to polyurea-forming temperature with a minor proportion of diphenylamine, said product, in respect to its melt-viscosity, being stable to heat at a temperature between 250° C. and 280° C. for at least one hour.

13. A composition of matter comprising the product obtained by heating substantially equimolecular proportions of heptamethylene diamine and urea to polyurea-forming temperature with a minor proportion of aniline, said product, in respect to its melt-viscosity, being stable to heat at a temperature between 250° C. and 280° C. for at least one hour.

EDWARD A. WIELICKI.

References Cited in the file of this patent

UNITED STATES PATENTS

| Number | Name | Date |
|---|---|---|
| 2,174,527 | Peterson | Oct. 3, 1939 |
| 2,292,443 | Hanford | Aug. 11, 1942 |

FOREIGN PATENTS

| Number | Country | Date |
|---|---|---|
| 880,530 | France | Jan. 4, 1943 |

OTHER REFERENCES

Ser. No. 239,456, Rink et al. (A. P. C.), published Apr. 20, 1943.